United States Patent
Fujita et al.

(10) Patent No.: US 8,263,916 B2
(45) Date of Patent: Sep. 11, 2012

(54) INDUCTION HEATING BODY AND INDUCTION HEATING CONTAINER

(75) Inventors: Hagino Fujita, Yokohama (JP); Takayuki Aikawa, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 620 days.

(21) Appl. No.: 12/449,440

(22) PCT Filed: Jan. 24, 2008

(86) PCT No.: PCT/JP2008/050933
§ 371 (c)(1),
(2), (4) Date: Aug. 7, 2009

(87) PCT Pub. No.: WO2008/096604
PCT Pub. Date: Aug. 14, 2008

(65) Prior Publication Data
US 2010/0320195 A1    Dec. 23, 2010

(30) Foreign Application Priority Data
Feb. 9, 2007   (JP) ................... 2007-030557

(51) Int. Cl.
*H05B 6/12* (2006.01)
(52) U.S. Cl. ......... 219/621; 219/624; 219/647; 219/672

(58) Field of Classification Search .................. None
See application file for complete search history.

(56) References Cited

U.S. PATENT DOCUMENTS

| | | | | |
|---|---|---|---|---|
| 4,220,839 | A * | 9/1980 | De Leon | 219/638 |
| 7,049,563 | B2 * | 5/2006 | Keishima et al. | 219/620 |
| 7,980,171 | B2 * | 7/2011 | Groll | 99/340 |
| 2003/0213793 | A1 * | 11/2003 | Cole et al. | 219/444.1 |

FOREIGN PATENT DOCUMENTS

| | | | | |
|---|---|---|---|---|
| JP | 07211443 | A | * | 8/1995 |
| JP | 07211444 | A | * | 8/1995 |
| JP | 07249480 | A | * | 9/1995 |
| JP | H07-296963 | A | | 11/1995 |
| JP | H08-187168 | | | 7/1996 |
| JP | 2001-203070 | A | | 7/2001 |
| JP | 2002-034786 | | | 2/2002 |
| JP | 2003-325327 | A | | 11/2003 |
| JP | 2007-044459 | | | 2/2007 |

* cited by examiner

*Primary Examiner* — Alonzo Chambliss
(74) *Attorney, Agent, or Firm* — Manabu Kanesaka

(57) ABSTRACT

In an induction heating body 1 in which heat is generated by eddy current induced by a high-frequency magnetic field, when forming a radially-directed separation section 31 separated from the center to the outer periphery, one of end brim parts 31a1 is superimposed on the other end brim parts 31a2 or they are close to each other with the end surfaces thereof 31b1 and 31b2 being abutted.

8 Claims, 7 Drawing Sheets

(a)

(b)

(a)

(b)

(c)

INDUCTION HEATING BODY AND INDUCTION HEATING CONTAINER

TECHNICAL FIELD

The present invention relates to an induction heating body in which heat is generated by joule heat generated by eddy current induced by a high-frequency magnetic field caused by an induction heating coil of an induction heating cooker or the like, as well as to an induction heating container provided with such an induction heating body.

BACKGROUND ART

Heretofore, the mainstream in cooking equipment was equipment using gas as a heat source. In recent years, however, cooking equipment generally known as induction heating cookers has come into wide use not only for commercial purposes, such as in the restaurant business, but also for household purposes, from the viewpoints of, for instance, safety, cleanliness, convenience and economy.

An induction heating cooker of this type heats an object to be heated by joule heat generated by eddy current induced by a high-frequency magnetic field caused by an induction heating coil provided inside the cooker. Therefore, heating and cooking can be performed safely without using fire. However, a cooker of this type has a disadvantage that usable cookware is limited, and cookware made of a magnetic metal such as iron or enameled iron must be used exclusively.

Under such circumstances, for solving the above-mentioned problem associated with the induction heating cooker, Patent Document 1 or Patent Document 2 discloses a container for an induction heating cooker provided with a non-magnetic (or non-conductive) container main body, for example.
Patent Document 1: JP-A-2003-325327
Patent Document 2: JP-A-H07-296963

DISCLOSURE OF THE INVENTION

Problem to be Solved by the Invention

Patent Document 1 proposes a heating method in which aluminum foil having a thickness of 0.10 to 100 μm is heated by eddy current generated by an induction heating cooker. According to the heating method of Patent Document 1, content in a container can be easily heated even when a non-magnetic container is used for cooking.

However, such heating method encounters a problem that, when erroneously heated without water or the like, aluminum foil is suddenly heated, burns easily and scatters, or the container is damaged by heat.

Patent Document 2 discloses an induction heating cooking container with safety mechanism. Specifically, it has a conductive heat-generating body in the form of a thin film on the inside bottom surface of a non-conductive container main body, in which a narrow part of which the width in the radial direction from the outer periphery is reduced by punching the middle part of the heat-generating body in a predetermined shape. According to the induction heating cooking disclosed in Patent Document 2, the narrow part provided in the heat-generating body is selectively fused at the time of erroneous handling such as non-water heating, whereby heating or ignition of the container by no-water heating or the like can be prevented.

As a result of intensive studies made by the inventors, it has been found that there are still problems awaiting a solution in putting these conventional technologies into practical use.

Specifically, in the induction heating cooking container disclosed in Patent Document 2, since the narrow part provided in the heat-generating body is selectively fused by locally heating it to high temperatures, the output of the heat-generating body is determined by the narrow part of which the temperature becomes the highest. Therefore, other parts of the heat-generating body are not efficiently heated, resulting in poor heating efficiency.

In addition, in the induction heating cooking container in Patent Document 2, a non-contact part is provided so as to separate the bottom surface of the narrow part and the inside bottom surface of the container main body. However, since heat generation at the narrow part tends to be excessive, the container body may be damaged even though such a non-contact part is provided.

The present invention has been made in view of the above-mentioned circumstances, and an object thereof is to provide an induction heating body which can be provided in the main body of a non-magnetic (or non-conductive) container and can be used as an induction heating container which heats accommodated materials to be heated by means of an induction heating cooker or the like, and in such an application, safety is improved by providing a part which is selectively broken under certain circumstances such as non-water heating, and prevents deterioration of heating efficiency in normal use and is capable of effectively eliminating breakage of the main body by heat, as well as to provide an induction heating container provided with such an induction heating body.

Means for Solving the Problem

The induction heating body according to the present invention is an induction heating body in which heat is generated by eddy current generated by a high-frequency magnetic field, wherein one or a plurality of radially-directed separation section separated from the center to the outer periphery are provided, and in said radially-directed separation section, one of separated end brim parts is superimposed on the other end brim part, or they are close to each other with the end surfaces thereof being abutted.

The induction heating body of the present invention with such a configuration is installed in a non-magnetic (or non-conductive) container main body, thereby to allow said container to be usable as an induction heating container which enables induction heating by an induction heating cooker. In addition, when heating materials to be heated by causing the induction heating body to generate heat in a state where it is in contact with materials to be heated, said radially-directed separation section is selectively heated excessively and broken, whereby safety mechanism works to stop the induction heating cooker.

Further, the radially-directed separation section, which is configured to be selectively broken, can be formed by superimposing one of separated end brim parts on the other end brim part, or by bringing them to be close to each other with the end surfaces thereof being abutted, the entire shape of the induction heating body can be arbitrarily selected. In normal use, no part in the induction heating body is locally heated to excessively high temperatures as compared with other parts. As a result, it is possible to allow the entire induction heating body to be effectively heated, preventing the heat efficiency of the induction heating body from being lowered. In addition, breakage by heat of the container main body can be effectively eliminated, whereby materials to be heated can be heated safely and easily by means of a commercially available induction heating cooker.

The induction heating body according to the present invention may have a configuration in which, at a portion where no breakage is desired, a radially-directed superimposed section is provided in which at least one pair of a mountain fold line and a valley fold line is formed along the radial direction.

Due to such a configuration, breakage of a portion other than the radially-directed separation section can be effectively prevented, and the radially-directed separation section can be preferentially broken without fail. As a result, a part to be broken can be uniquely determined.

The induction heating body of the present invention may have a configuration in which, when forming the radially-directed separation part, in superimposing one of separated end brim parts on the other end brim part in the radially-directed separation section, at least one of end brim parts is folded along the end brim to allow said one of end brim parts to be superimposed on the other end brim part with the end surfaces being uniformly arranged. Alternatively, the induction heating body of the present invention may have a configuration in which, in superimposing one of separated end brim parts on the other end brim part, one of end brim parts and the other end brim part are both folded along the end brim to allow them to be engaged.

In order to suppress troubles which occur when the radially-directed separation section is broken, it is preferred that one of end brim parts and the other end brim part which are superimposed be further folded while keeping the superimposed state, and that the resulting multiply-folded part be then compressed.

Considering influences caused by the breakage of the radially-directed separation section, the induction heating body according to the present invention may have a configuration in which a covering material is superimposed on both or either one of the upper surface side and the lower surface side of said radially-directed separation section such that the covering material extends over said one of separated end brim parts and the other end brim part, followed by compressing to form a stacked structure.

The induction heating container according to the present invention may have a configuration in which an induction heating body in which heat is generated by eddy current induced by a high-frequency magnetic field is provided on the inside bottom surface of the container main body, said induction heating body has one or a plurality of radially-directed separation sections separated from the center to the outer periphery, and in said radially-directed separation section, one of separated end brim parts is superimposed on the other end brim part, or they are close to each other with the end surfaces thereof being abutted.

The induction heating container of the present invention having the above-mentioned configuration is capable of heating materials to be heated by induction heating by an induction heating cooker. In addition, under predetermined circumstances such as non-water heating, the radially-directed separation section is selectively heated excessively and broken, whereby safety mechanism works to stop the induction heating cooker.

Advantageous Effects of the Invention

As mentioned hereinabove, according to the present invention, in enabling heating of materials to be heated by induction heating by means of an induction heating cooker or the like, a part which is selectively broken under predetermined circumstances such as non-water heating is provided in the induction heating body, thereby enhancing safety in heating. In addition, in normal use, lowering in heating efficiency can be suppressed, and breakage of the container main body can be effectively eliminated, whereby a material to be heated can be heated safely and easily by means of a commercially available induction heating cooker.

BEST MODE FOR CARRYING OUT THE INVENTION

Preferred embodiments of the present invention will be explained hereinbelow with reference to the drawings.

FIG. 1(a) is a perspective view showing an outline of the induction heating container according to this embodiment, and FIG. 1(b) is a cross-sectional view taken along line A-A in FIG. 1(a).

Figure 1:
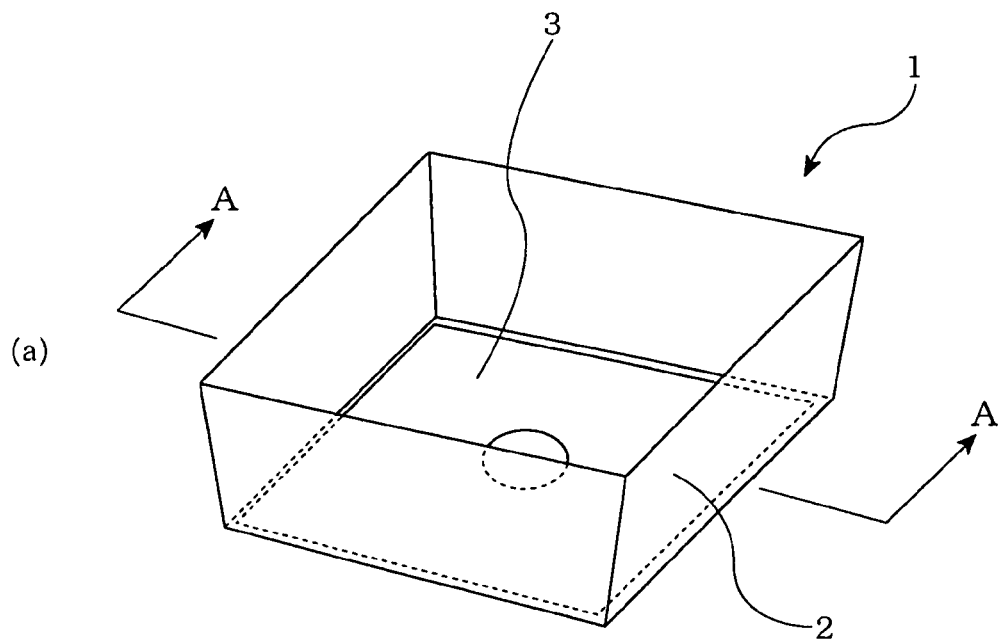
FIG. 1(a) is a perspective view of the general appearance of an induction heating container of the invention.
FIG. 1(b) is a cross section of A-A in FIG. 1(a)
Figure 1:
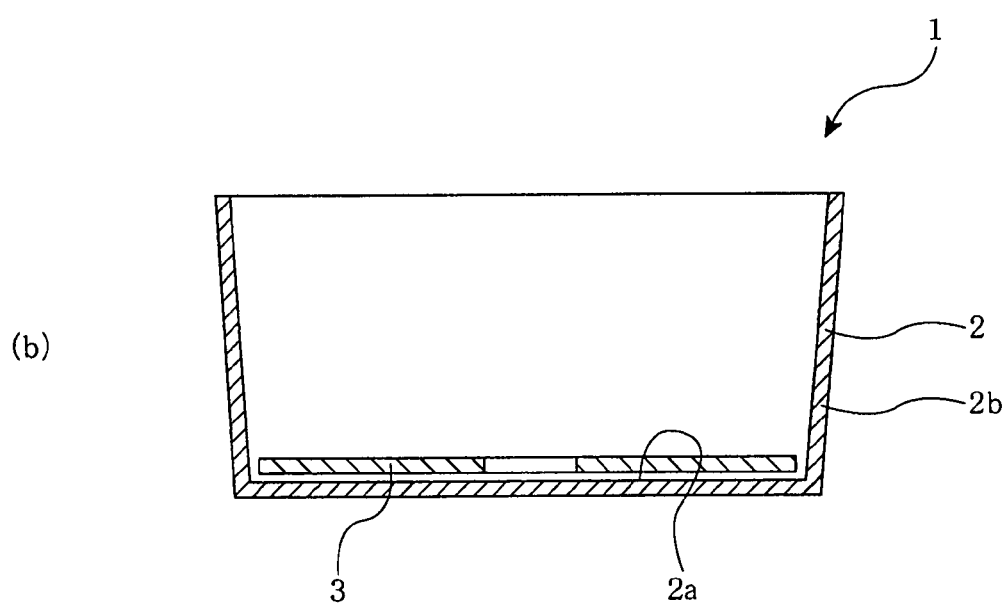

A container 1 shown in FIG. 1 is provided with a container main body 2 capable of accommodating materials to be heated, and an induction heating body 3 in which heat is generated by eddy Current induced by a high-frequency magnetic field. The induction heating body 3 is provided on the inside bottom surface 2a of the container main body 2.

In the shown example, the inside bottom surface 2a of the container main body 2 has a planer shape which is substantially square. The container main body 2 is provided with a side wall part 2b which is vertical and surrounds the inside bottom surface 2a, thereby allowing materials to be heated to be accommodated. The planer shape of the inside bottom surface 2a is not limited to the example shown. For example, the inside bottom surface 2a may have a rectangular shape, a circular shape, or a polygonal shape such as triangle, pentagon, and hexagon.

The container main body 2 may be formed of a synthetic resin material such as a polystyrene-based resin such as polystyrene, a polyester-based resin such as polyethylene terephthalate, a polyolefin-based resin such as polypropylene and a polyamide-based resin, and various common non-magnetic materials including paper and glass. By forming the container main body 2 using these materials, an induction heating cooking container which is usable in an induction heating cocker can be provided at a low cost.

For the induction heating body 3, it is possible to use a conductive material which can generate heat by a mechanism in which eddy current is induced in the conductive material by a high-frequency magnetic field generated by an induction heating coil provided inside the induction heating cooker or the like, and the conductive material is then heated by the joule heat generated by the electric resistance thereof. Examples of such conductive materials include aluminum, nickel, gold, silver, copper, platinum, iron, cobalt, tin, zinc, alloys thereof, and a resin film or paper imparted with conductivity. More specifically, when aluminum is used as a metal material, the induction heating body 3 may be formed of aluminum foil having a thickness of about 0.10 to 100 μm.

In this embodiment, by installing such induction heating body 3 on the inside bottom surface 2a of the container main body 2, materials to be heated which are accommodated within the container main body 2 can be heated by induction heating by means of an induction heating cooker.

In order to install the induction heating body 3 in the container main body 2, the induction heating body 3 may be adhered to the container main body 2 by heat sealing or by means of an adhesive tape or an adhesive. It is also possible to laminate the induction heating body 3 on the container main body 2 while covering the induction heating body 3 with a covering material. As long as the induction heating body 3 generates heat in a state where it is in direct or indirect contact with materials to be heated to heat the materials, there are no specific restrictions on the means for installing the induction heating body 3.

The installation manner is not limited to one shown the figure, in which the induction heating body 3 is installed such that it is brought into contact with the inside bottom surface 2a. The induction heating body 3 may be installed in such a manner that it is separated from the inside bottom surface 2a. In order to install the induction heating body 3 such that it is separated from the inside bottom surface 2a, although not particularly shown, it is possible to allow a supporting part which is projected from the inside bottom surface 2a of the container main body 2 to support the induction heating body 3, or to provide a supporting arm extending from the outer peripheral part of the induction heating body 3 and to allow this supporting arm to be engaged with the periphery of the opening of the container main body 2.

Figure 2:
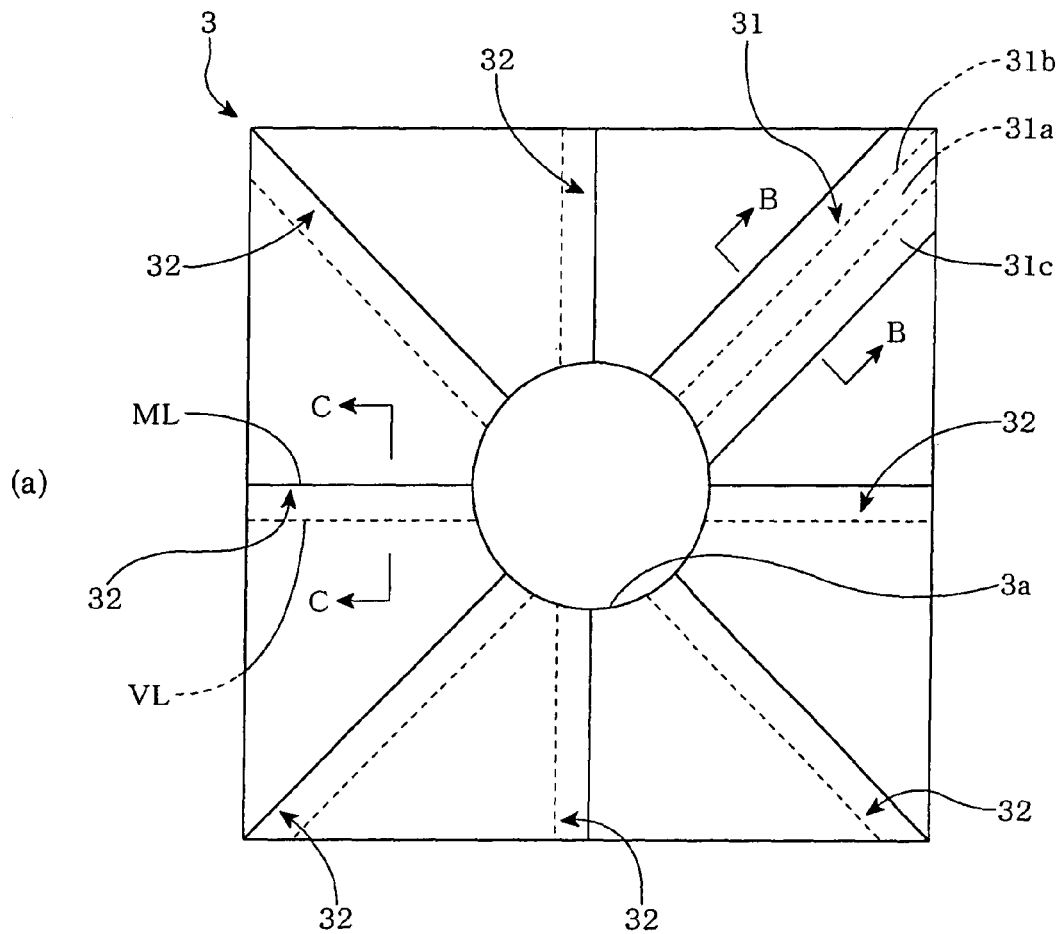
FIG. 2(a) is a plan view of the general appearance of the induction heating container of the invention.
FIG. 2(b) is a cross section of B-B in FIG. 2(a)
FIG. 2(c) is a cross section of C-C in FIG. 2(a)
Figure 2:
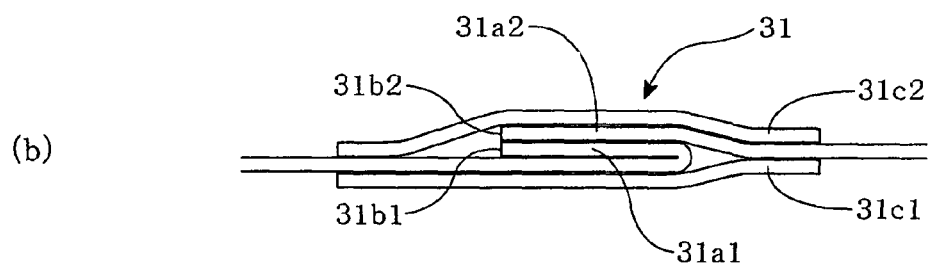
Figure 2:
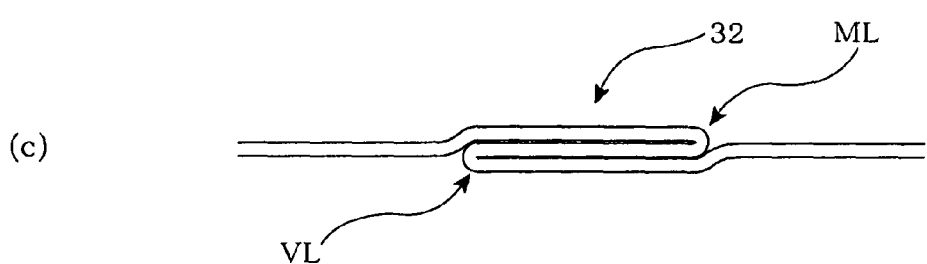

Here, FIG. 2(a) is a top view showing one example of the induction heating body according to this embodiment, in which the induction heating body 3 has a planer shape, i.e., a substantially square shape.

In the induction heating body 3 of this example, of eight directions including four directions extending from the center to the outer periphery along the radial direction (i.e. upper, lower, left and right), and four directions in the middle of these four directions (i.e. directions along the diagonal lines of the induction heating body 3), in the direction shown in the upper right of the figure, the radially-directed separation section 31 is formed such that it extends along the radial direction. In each of the remaining seven directions, a radially-directed superimposed portion 32 is formed in such a manner that it extends along the radial direction.

The radially-directed separation section 31, as apparent from its cross section taken along the line crossing orthogonally the longitudinal direction thereof as shown in FIG. 2(b), for example, can be formed by folding along the end rim, one end brim part 31a1, which has been separated from the center to the outer periphery, thereby allowing the other end brim part 31a2 to be superimposed thereon such that the end surfaces 31b1 and 31b2 are uniformly arranged, and stacking covering materials 31c1 and 31c2 one on another such that they extend over one of end brim parts 31a1 and the other end brim part 31a2, followed by compression.

The radially-directed superimposed section 32, as is apparent from its cross section taken along the line crossing orthogonally the longitudinal direction thereof as shown in FIG. 2(c), can be formed by folding a part from which the radially-directed superimposed section 32 is obtained such that a pair of a mountain fold line and a valley fold line is formed along the radial direction of the induction heating body 3.

FIG. 2(b) is a cross sectional view taken along line B-B of FIG. 2(a), and FIG. 2(c) is a cross sectional view taken along line C-C of FIG. 2(c).

Figure 3:
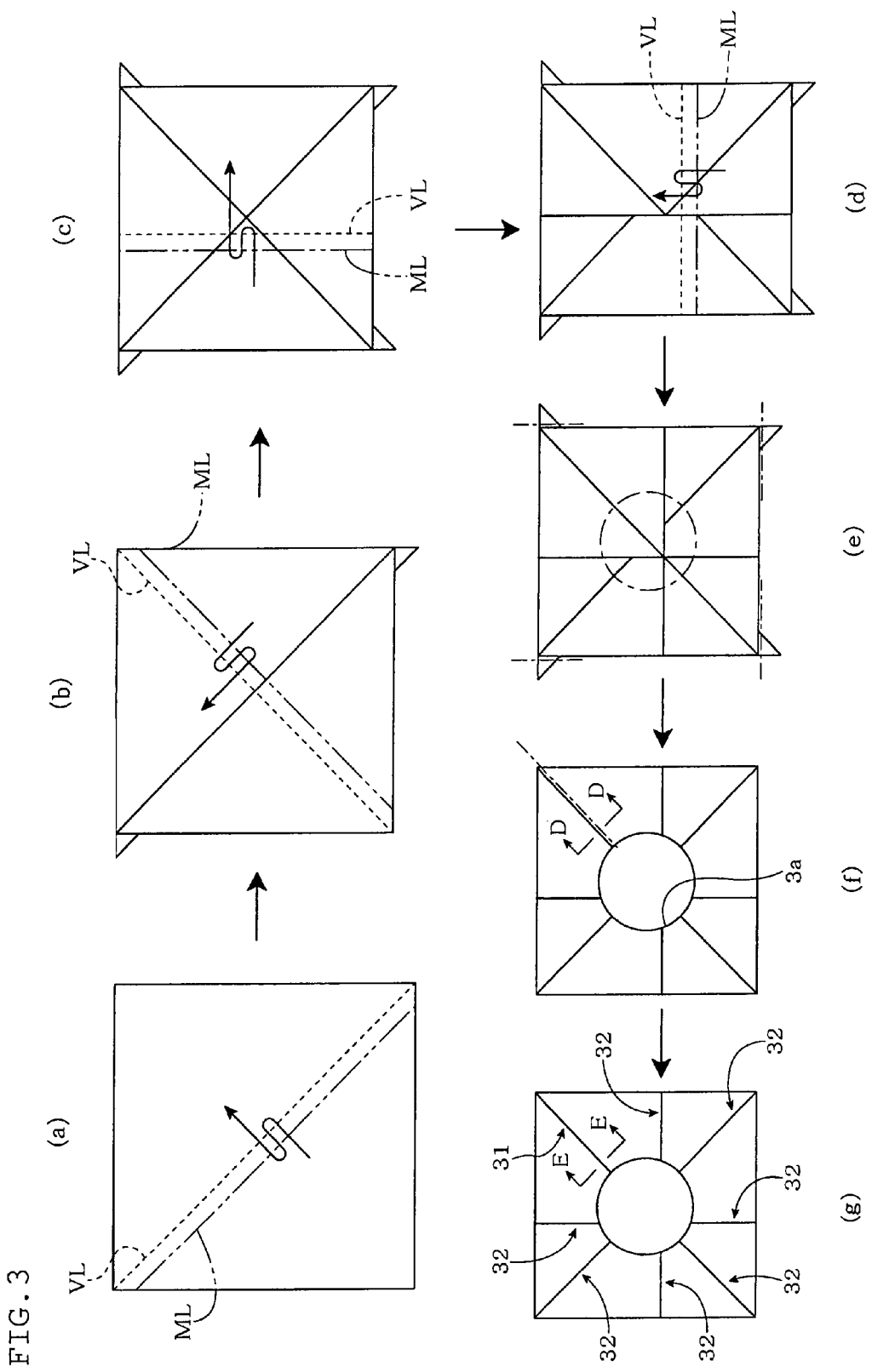
FIG. 3(a) is an explanatory view showing the manner of folding when forming the induction heating body.
FIG. 3(b) is an explanatory view showing the manner of folding when forming the induction heating body.
FIG. 3(c) is an explanatory view showing the manner of folding when forming the induction heating body.
FIG. 3(d) is an explanatory view showing the manner of folding when forming the induction heating body.
FIG. 3(e) is an explanatory view showing the manner of folding when forming the induction heating body.
FIG. 3(f) is an explanatory view showing the manner of folding when forming the induction heating body.
FIG. 3(g) is an explanatory view showing the manner of folding when forming the induction heating body.

In order to form the induction heating body 3 having such a radially-directed separation section 31 and the radially-directed superimposed section 32, for example, the conductive material as mentioned above is subjected to folding processing as shown in FIG. 3.

FIG. 3 is an explanatory view showing how to form the induction molding body 3, in which the valley fold line VL is indicated by a chain line and the mountain fold line ML is indicated by an alternate broken line. Furthermore, a part at which an unnecessary part is cut away is indicated by a dash dotted line.

In order to form the induction heating body 3 according to the example shown in FIG. 3, a conductive material which has been cut in a square shape such as aluminum foil is prepared at first.

Then, the conductive material is folded along the valley fold line VL and the mountain fold line ML shown in FIG. 3(a) to make a pleat fold along a diagonal line from the upper left to the lower right of the figure (see FIG. 3(b)). Similarly, as shown in FIGS. 3(b) to (d), sequentially, each part shown in these figures is folded to make a pleat fold.

Subsequently, unnecessary parts are cut away along a dashed line shown in FIG. 3(e), and a circular through hole 3a is provided in the center.

At this point, a radially-directed superimposed section 32 is formed in all of the eight directions.

Then, along a dashed line in FIG. 3(f), a part which is positioned in the direction towards the upper right part of the figure along the mountain fold line ML is cut away (see FIG. 4(a)). As a result, as shown in FIG. 4(b), one of separated end brim parts 31a1 is folded along the end brim, and then is superimposed on the other end brim part 31a2 with the end surfaces 31c1 and 31c2 being uniformly arranged. Then, as shown in FIG. 4(c), by stacking the covering materials 31c1 and 31c2 one on another, followed by compression, the radially-directed separation section 31 is formed in a direction towards the upper right of the figure, and the radially-directed superimposed section 32 is formed in the remaining seven directions.

Figure 4:
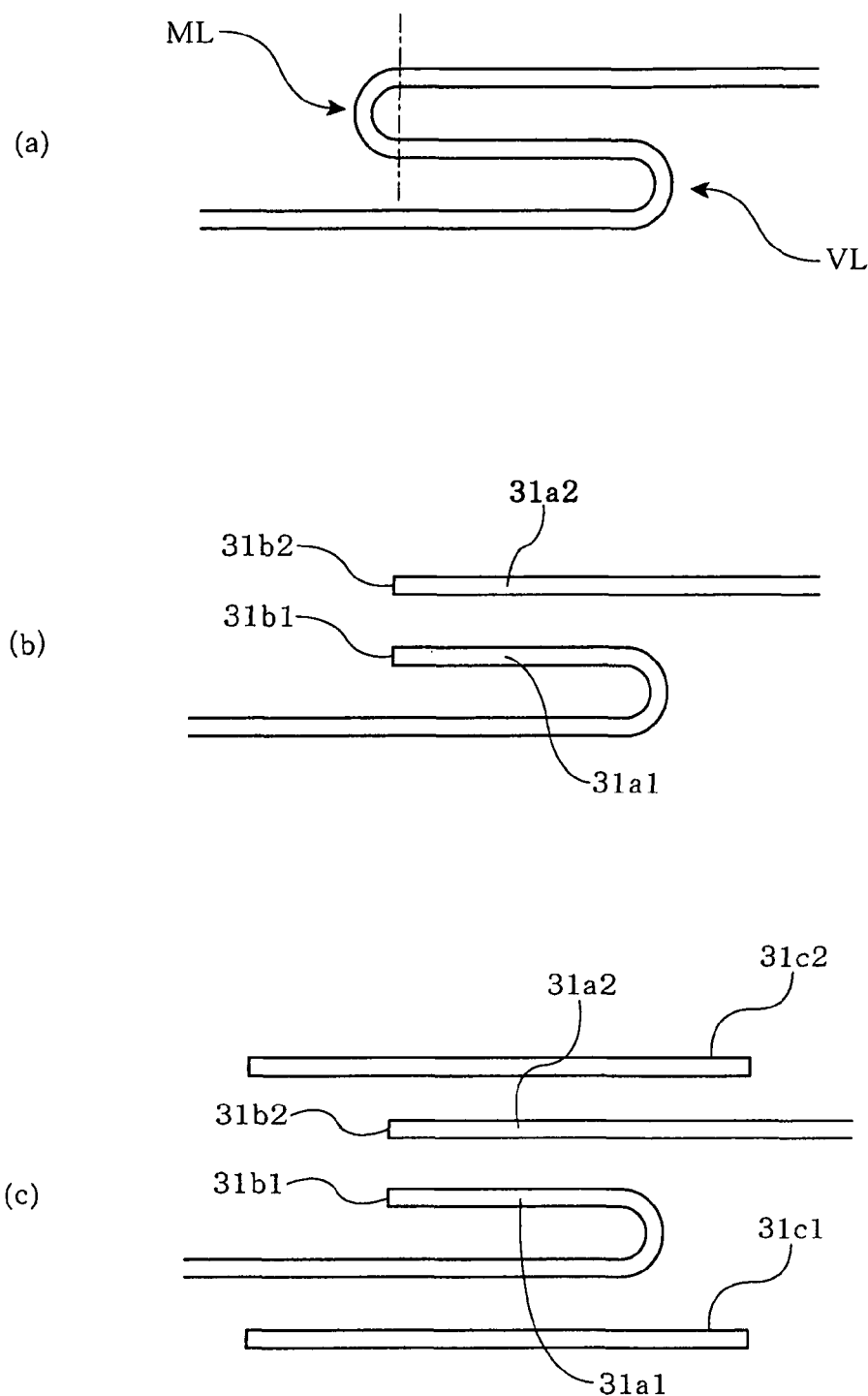
FIG. 4(a) is a cross section of D-D in FIG. 3(f)
FIG. 4(b) is a cross section of E-E in FIG. 3(g)
FIG. 4(c) is an explanatory view showing an example of a radially-directed separation section in which, from the condition of FIG. 4(b), stacking the covering materials followed by compression and lamination.

FIG. 4 is an explanatory view showing one example in which the radially-directed separation section 31 is formed. FIG. 4(a) is a cross sectional view taken along line D-D in FIG. 3(f), and FIG. 4(b) is a cross sectional view taken along line E-E in FIG. 3(g). In forming the radially-directed separation section 31, a slit may be formed at first in a conductive material, and the conductive material is then subjected to the above-mentioned folding processing.

The container 1 in which the above-mentioned induction heating body 3 is provided is placed on a commercially available induction heating cooker for use. The size thereof can be set according to the dimension of a heating coil provided in an induction heating cooker to be used. For example, a common heating coil provided in a commercially available induction heating cooker for household use has an inner diameter of about 5 cm and an outer diameter of about 20 cm. A larger heating coil for business use is also available, but the size of a heating coil can be appropriately selected according to the size of an induction heating cooker which is supposed to be used.

In this embodiment, as mentioned above, the radially-directed separation section 31, which is separated from the center to the outer periphery is provided along the radial direction. In this radially-directed separation section 31, one of end brim parts 31a1 and the other end brim part 31a2, which have been separated, are superimposed.

Figure 5:
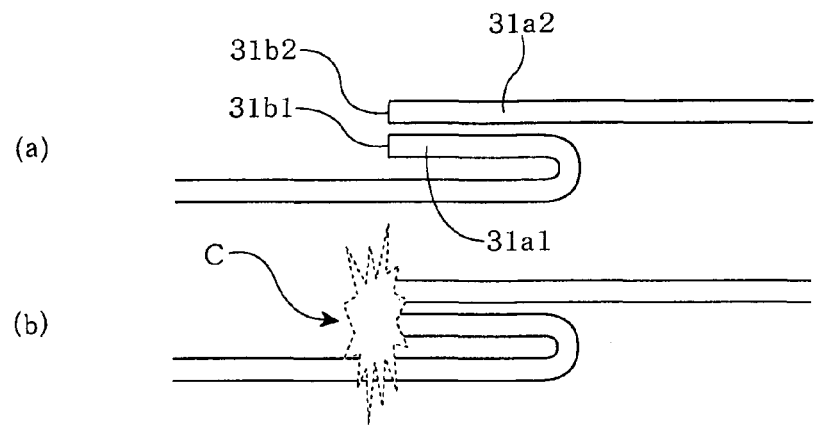
FIG. 5(a) is an imaginary view showing a state before breakage of the example of the radially-directed separation section.
FIG. 5(b) is an imaginary view shown in FIG. 5(a) showing breakage of one example of the radially directed separation section.

As a result, as for the eddy current induced in the induction heating body 3, an electric current path is formed at the end surface 31b1 of the end brim part 31a1 or its vicinity, and at the end surface 31b2 of the end brim part 31a2 or its vicinity, and the resistance value in the radially-directed separation section 31 becomes the largest. As a result, the amount of generated power in the radially-directed separation section 31 becomes the largest, and as a result, under specific circumstances such as non-water heating, the radially-directed separation section 31 selectively generates an excessive amount of heat. If it continues to generate heat, as shown in FIG. 5, electric discharge occurs between the end surface 31b1 of the end brim part 31a1 or its vicinity and the end surface 31b2 of the end brim part 31a2 or its vicinity. The radially-directed separation section 31 undergoes breakage due to fusing by the electric discharge, and as a result, safety mechanism works to stop an induction heating cooker.

FIG. 5 is an imaginary view showing a state in which the radially-directed separation section 31 is broken, in which FIG. 5(a) shows a state before the breakage of the radially-directed separation section 31. FIG. 5(b) diagrammatically shows a state in which the end brim parts 31a1, 31a2 and vicinities thereof are fused when the radially-directed separation section 31 is broken. The broken part is indicted by a referential numeral C. It is difficult to strictly identify the part which is fused by electric discharge. The part shown by the numeral C is not limited to one shown in the figure (the same can be applied to FIGS. 6 to 9, mentioned later).

The radially-directed separation section 31 can be formed by superimposing one of separated end brim parts 31a1 and the other end brim part 31a2, the entire shape of the induction heating body 3 can be arbitrarily set. In normal use, no part is excessively heated locally as compared with other parts. Accordingly, the entire induction heating body 3 can be heated effectively to prevent its heating efficiency from being deteriorated. In addition, breakage by heat of the container main body 2 can be effectively prevented, whereby materials to be cooked can be heated safely and easily by using a commercially available induction heating cooker.

In this embodiment, taking into consideration the influence of a spark generated at the time of breakage of the radially-directed separation section 31 and scattering of broken pieces of the induction heating body 3, the covering materials 31c1 and 31c2 are stacked on one of end brim parts 31a1 and the other end brim part 31a2 which are superimposed in the radially-directed separation section 31 such that they extend over one of end brim parts 31a1 and the other end brim part 31a2, and compressed.

That is, at the time of the breakage of the radially-directed separation section 31, when the end brim part 31a1, the end brim part 31a2 and the vicinities thereof are electrically discharged while being exposed to the surface and fused, the container main body 2 is damaged by a spark generated at this time, materials to be heated are burned, and scattered broken pieces of the induction heating main body 3 may be mixed in the materials to be heated. In order to avoid such troubles, a part of the radially-directed separation section 31 is covered by the covering materials 31c1 and 31c2, whereby the part is prevented from being exposed to the surface.

If the resistance value of the radially-directed separation section 31 is too high, an induction heating cooker cannot detect the induction heating body 3, and heating may not be started. Stacking and compressing covering materials is preferable in order to avoid an extreme increase in resistance value in the radially-directed separation section 31.

In the covering materials 31c1 and 31c2, it is preferable to use the same conductive materials as that used in the induction heating body 3. However, it is also possible to use a general-purpose non-magnetic material which is the same as that used in the container main body 2.

In this embodiment, the through hole 3a which is formed almost in the middle of the induction heating body 3 serves to cause breakage to generate easily in the radially-directed separation section 31. The shape of the through hole 35 is not limited to the circular shape as shown in the figure. For example, the through hole 35 may be radially-formed slits.

In this embodiment, a predetermined part is folded in such a manner that a pair of a mountain fold line and a valley fold line is formed along the radial direction of the induction heating body 3 to form a radially-directed superimposed section 32. The radially-directed superimposed section 32 formed in this way is not heated easily as compared with other parts. The reason therefor is considered to be as follows. The part where the radially-directed superimposed section 32 is formed has an increased surface area due to the folding, whereby radiation effects can be obtained.

Therefore, by forming the radially-directed superimposed section 32 at a place where elimination of breakage is required, breakage of a part other than the radially-directed separation section 31 can be effectively prevented, whereby the radially-directed separation section 31 is preferentially broken. As a result, a part at which breakage occurs can be uniquely determined.

In the shown example, in the part at which the radially-directed superimposed section 32 is formed, the length along the radial direction extending from the center to the outer periphery is the shortest. If no radially-directed superimposed section 32 is formed, such part tends to have an increased eddy current density. Such part may be heated excessively as compared with the radially-directed separation section 31 is heated. Therefore, in order to uniquely determine a broken part, it is particularly effective to form the radially-directed superimposed section 32 in a part where the eddy current density tends to be high, thereby preventing this part from being broken.

The present invention is explained hereinabove with reference to preferred embodiments. The present invention is not limited to the embodiments as mentioned above, and it is needless to say various modifications are possible within the scope of the present invention.

For example, in the above-mentioned embodiments, of the eight directions, the radially-directed separation section 31 is formed only in the direction towards the right upper part of the figure, and the radially-directed superimposed section 32 is formed in each of the remaining seven directions. However, the number of the radially-directed separation section 31 is not limited to one. A plurality of the radially-directed separation sections 31 may be formed. For example, the radially-directed separation section 31 may be formed in each of the four directions on the diagonal line of the induction heating body 30, i.e. upper right, lower left, upper left and lower right directions. The radially-directed superimposed section 32 may be formed in the remaining four directions, i.e. upper, lower, left and right directions. In this case, it is preferred that each of the plurality of radially-directed separation section 31 be formed with the conditions including the length from the center to the outer periphery being the same.

In the above-mentioned embodiment, the covering materials 31c1 and 31c2 are stacked one on another on one of end brim parts 31a1 and the other end brim part 31a2 such that they extend over the end brim parts, and compressed. The covering material may be stacked, and compressed on either one of the upper surface or the lower surface of the radially-directed separation section 31, according to need.

Figure 6:
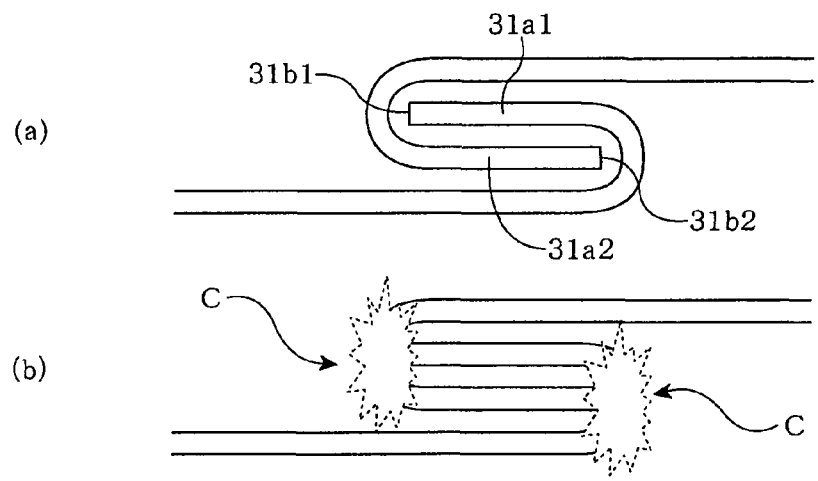
FIG. 6(a) is an imaginary view showing a state before breakage of another example of the radially-directed separation section.
FIG. 6(b) is an imaginary view shown in FIG. 6(a) showing breakage of another example of the radially-directed separation section.
Figure 7:
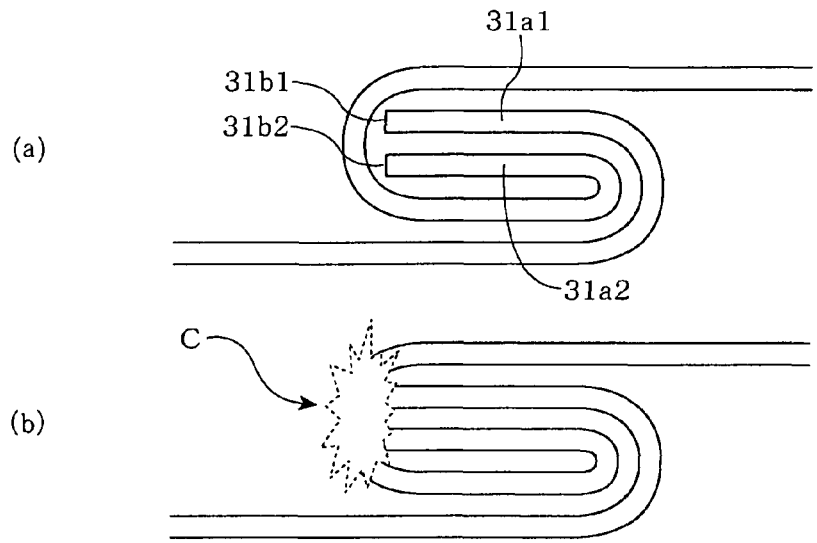
FIG. 7(a) is an imaginary view showing a state before breakage of another example of the radially-directed separation section.
FIG. 7(b) is an imaginary view shown in FIG. 7(a) showing breakage of another example of the radially-directed separation section.
Figure 8:
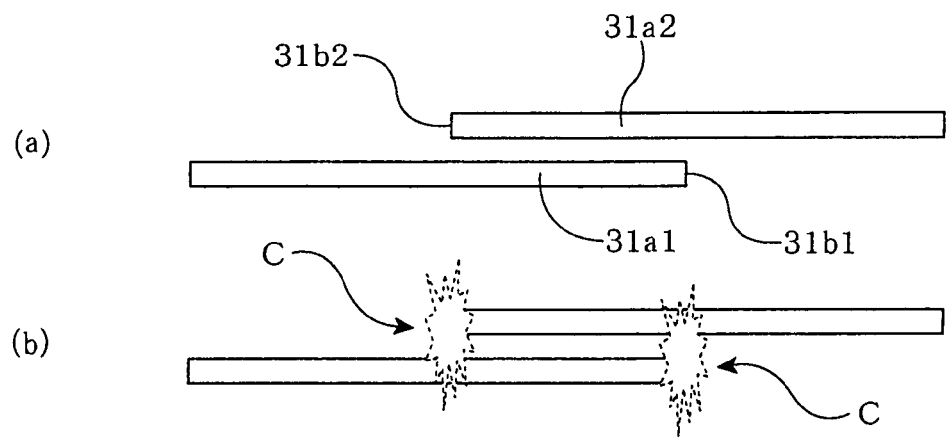
FIG. 8(a) is an imaginary view showing a state before breakage of another example of the radially-directed separation section.
FIG. 8(b) is an imaginary view shown in FIG. 8(a) showing breakage of another example of the radially-directed separation section.

Furthermore, in the above-mentioned embodiment, the radially-directed separation section 31 is formed by folding one of end brim parts 31a1 along the end brim, and superimposing the end brim part 31a1 on the other end brim part 31a2 with the end surfaces 31b1 and 31b2 being uniformly arranged. The manner of superimposing the end brim part 31a1 and the end brim part 31a2 is not limited thereto. For example, as shown in FIG. 6, it is possible to fold both one of end brim parts 31a1 and the other end brim part 31a2 along the end brim, and to allow them to be overlapped one on another such that they are engaged with each other. Furthermore, as shown in FIG. 7; one of end brim parts 31a1 may be folded twice along the end brim, and then superimposed on the other end part 31a2 such that they are engaged with each other, with the end surfaces 31b1 and 31b2 being uniformly arranged.

Figure 9:
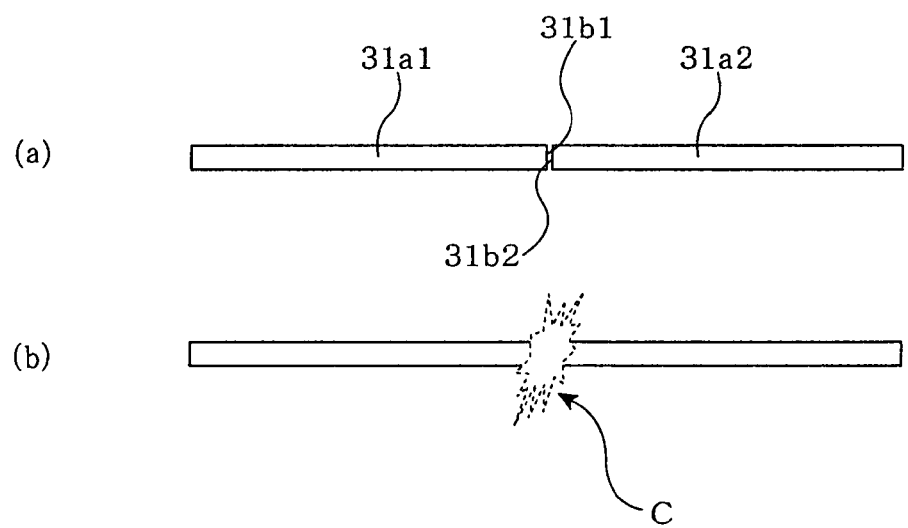
FIG. 9(a) is an imaginary view showing a state before breakage of another example of the radially-directed separation section.
FIG. 9(b) is an imaginary view shown in FIG. 9(a) showing breakage of another example of the radially-directed separation section.

As for the radially-directed separation section 31, if it is possible to allow the resistance value to be maximum so as to cause the amount of heat generated in the radially-directed separated part 31 to be the largest, the both end brim parts 31a1 and 31a2 may be superimposed one on another without folding the both end brim parts 31a1 and 31a2. As shown in FIG. 9, the end surfaces 31b1 and 31b2 are abutted so as to allow the end brim parts 31a1 and 31a2 to be close. In these embodiments, however, electric discharge may occur locally to cause excessive heat generation. Therefore, as for the end brim parts 31a1 and 31a2, which are separated in the radially-directed separation section 31, it is preferred that at least one of them be folded.

FIGS. 6 to 9 are imaginary views which show the state where the radially-directed separation section 31 is broken in the above-mentioned various modifications, in association with FIG. 5 which explains the above-mentioned embodiments.

In an embodiment in which one or both of the end brim parts 31a and 31b are folded to form the radially-directed separation section 31, the number of times required for folding the end brim parts 31a1 and 31a2 or the folding direction are not limited to those shown in the figure. A part formed by folding either one or both of the end brim parts 31a1 and 31a2 may be further folded twice, three times or more. Due to multiple folding, it is expected that troubles which occur when the radially-directed separation section 31 is broken can be suppressed.

Figure 10:
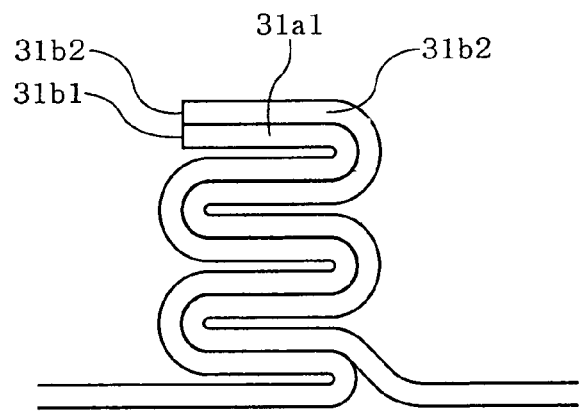
FIG. 10 is an explanatory view showing an example in which the superimposed end brim parts as shown in FIG. 5(a) are multiply-folded.
Figure 11:
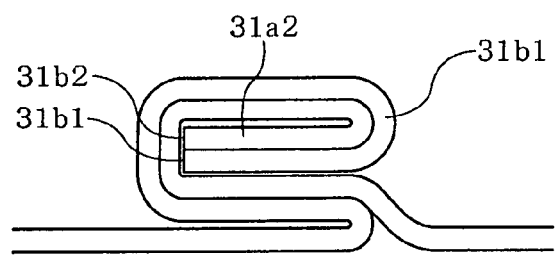
FIG. 11 is an explanatory view showing an example in which the superimposed end brim parts as shown in FIG. 5(a) are folded such that they are rolled up inwardly.

For example, the state shown in FIG. 5, in which one of end brim parts 31a1 is folded along the end brim and is superimposed on the other end brim part 31a2 with the end surfaces 31b1 and 31b2 being uniformly arranged, may be changed to the state shown in FIG. 10, in which the folding direction is changed alternately so as to allow the superimposed part be multiple (quadruple in the example shown), or to the state shown in FIG. 11 in which folding is performed such that the superimposed part is rolled up.

Figure 12:
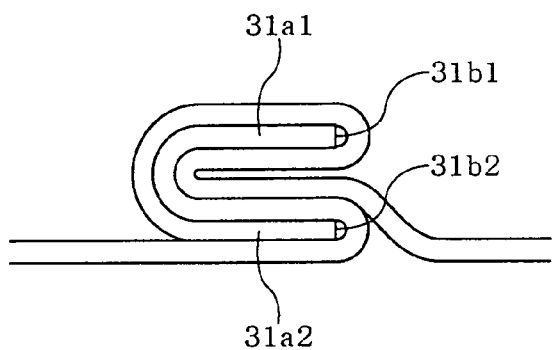
FIG. 12 is an explanatory view showing an example in which the superimposed end brim part as shown in FIG. 6(a) is folded.

Furthermore, in FIG. 6, the end brim part 31a1 and the end brim part 31a2 are folded along the end brim and the end brim part 31a1 is superimposed on the end brim part 31a2 such that they are engaged with each other. This state may be changed to a state shown in FIG. 12, in which the superimposed part is folded.

By applying pressure on the superimposed part from the up and down directions, the end brim parts 31a1 and 31a2 can be compressed and fixed. As for the means for applying pressure, pressure may be applied with the end brim parts 31a1 and 31a2 being interposed between two flat boards. In order to compress the end brim parts 31a1 and 31a2 strongly, it is preferred that compressing be performed by embossing by means of a force piston provided with linear, wavy or dot-like pressing protrusions.

The advantageous effects of the present invention are not impaired even if a hole is formed by penetration of the pressing protrusion of a force piston through the induction heating body 3.

In the state where the end brim parts 31a1 and 31a2 are superimposed, it is preferable to fold the superimposed part in order to ensure compressing and fixation of the end brim parts 31a1 and 31a2. In this case, the manner of folding is not limited to that shown in figure, in which folding is performed regularly. The end brim parts 31a1 and 31a2 may be folded irregularly in such a manner that they are twisted.

In the above-mentioned embodiments, an example is shown in which a piece of a conductive material which has been cut in a square shape is subjected to folding processing to form the induction heating body 3. The induction heating body 3 may be one which is prepared by combining a plurality of conductive materials.

INDUSTRIAL APPLICABILITY

As mentioned hereinabove, the present invention provides an induction heating body and an induction heating container which are capable of heating materials to be heated safely and easily by means of a commercially available induction heating cooker.

The invention claimed is:

1. An induction heating body in which heat is generated by eddy current generated by a high-frequency magnetic field, wherein one or a plurality of radially-directed separation section separated from the center to the outer periphery are provided, and in said radially-directed separation section, one of separated end brim parts is superimposed on the other end brim part or they are close to each other with the end surfaces thereof being abutted.

2. The induction heating body according to claim 1, wherein said radially-directed separation section is allowed to be selectively heated excessively and broken.

3. The induction heating body according to claim 2, wherein a radially-directed superimposed section is formed at a part where elimination of breakage is required such that at least a pair of a mountain fold line and a valley fold line is formed by folding along the radial direction.

4. The induction heating body according to claim 1, wherein, when one of separated end brim part is superimposed on the other end brim part, at least one end brim part is folded along the end brim so as to allow said one end brim part to be superimposed on the other end brim part with the end surfaces thereof being uniformly arranged.

5. The induction heating body according to claim 1, wherein, when one of separated end brim parts is superimposed on the other end brim part, both one of the end brim part and the other end brim part are folded along the end brim such that they are engaged with each other.

6. The induction heating body according to claim 4, wherein, one of end brim parts and the other end brim part which are superimposed are further folded while keeping the superimposed state and the thus multiply-folded part is compressed.

7. The induction heating body according to claim 1, wherein a covering material is superimposed on both or either one of the upper surface or the lower surface of said radially-directed separation section and compressed such that the covering material extends over said one of separated end brim parts and the other end brim part.

8. An induction heating container wherein an induction heating body in which heat is generated by eddy current generated by a high-frequency magnetic field is provided on the inside bottom surface, said induction heating body has one or a plurality of radially-directed separation section separated from the center towards the outer periphery, and, in said radially-directed separation section, one of separated end brim parts is superimposed on the other end brim part or they are close to each other with the end surfaces thereof being abutted.

* * * * *